United States Patent [19]

Gilb

[11] 4,005,942

[45] Feb. 1, 1977

[54] METAL HANGER

[75] Inventor: Tyrell Gilb, Berkeley, Calif.

[73] Assignee: Simpson Manufacturing Co., Inc., San Leandro, Calif.

[22] Filed: Mar. 22, 1976

[21] Appl. No.: 668,821

[52] U.S. Cl. .............................. 403/189; 403/190
[51] Int. Cl.² ........................................ F16B 5/00
[58] Field of Search ............ 403/232, 231; 52/751, 52/752

[56] References Cited

UNITED STATES PATENTS

| 753,053 | 2/1904 | Eberhardt | 52/751 |
|---|---|---|---|
| 804,451 | 11/1905 | Carlson | 51/751 |
| 874,514 | 12/1907 | Lindow | 52/751 |
| 3,633,950 | 1/1972 | Gilb | 52/751 |
| 3,945,741 | 3/1976 | Wendt | 403/232 |

FOREIGN PATENTS OR APPLICATIONS

| 862,969 | 2/1971 | Canada | 52/751 |
|---|---|---|---|
| 405,840 | 2/1934 | United Kingdom | 52/751 |

Primary Examiner—Andrew V. Kundrat
Attorney, Agent, or Firm—James R. Cypher

[57] ABSTRACT

A wood framing hanger including an angle element having a top flange adapted for connection to the top side of a wood structural member and a lower depending flange formed at a substantially right angle. The hanger also includes a stirrup element having a seat and right angularly related side flanges. The stirrup flanges are one half the width of the seat and welded at their upper edges to the depending flange of the angle element. The top flange angle element is formed with nailing tabs at one end and a welding tongue at the other end. The top flange configuration is devised as a nested progressive for high production automated tooling. Likewise the stirrup element is designed for high-production automated tooling and any size may be made from the same single die system using different width coil stock.

6 Claims, 7 Drawing Figures

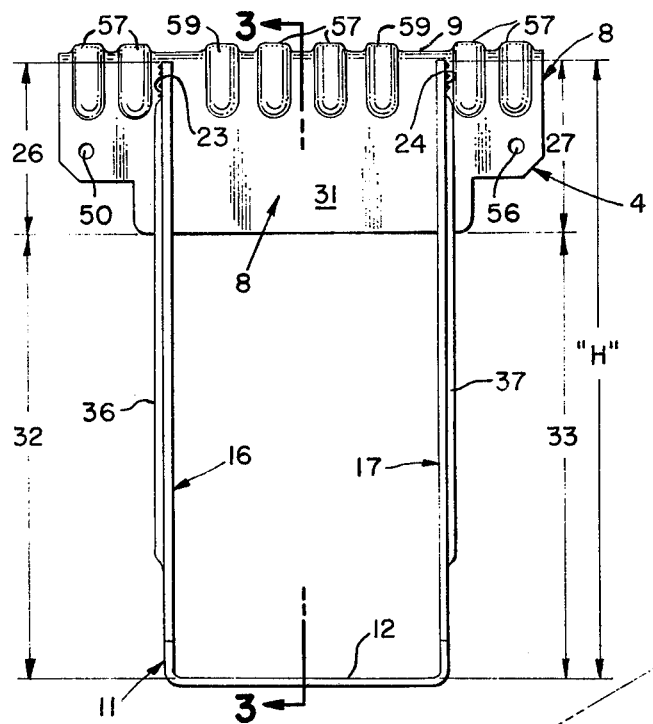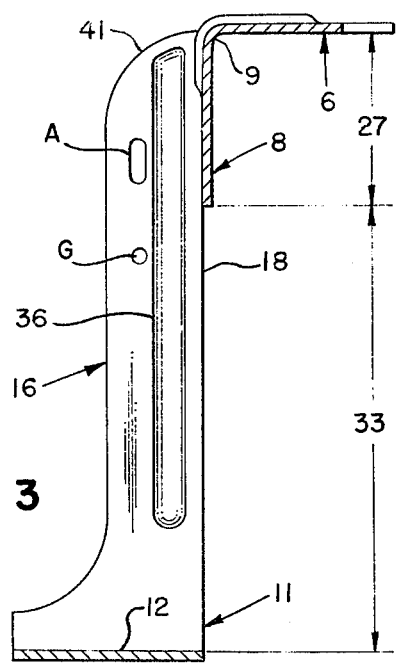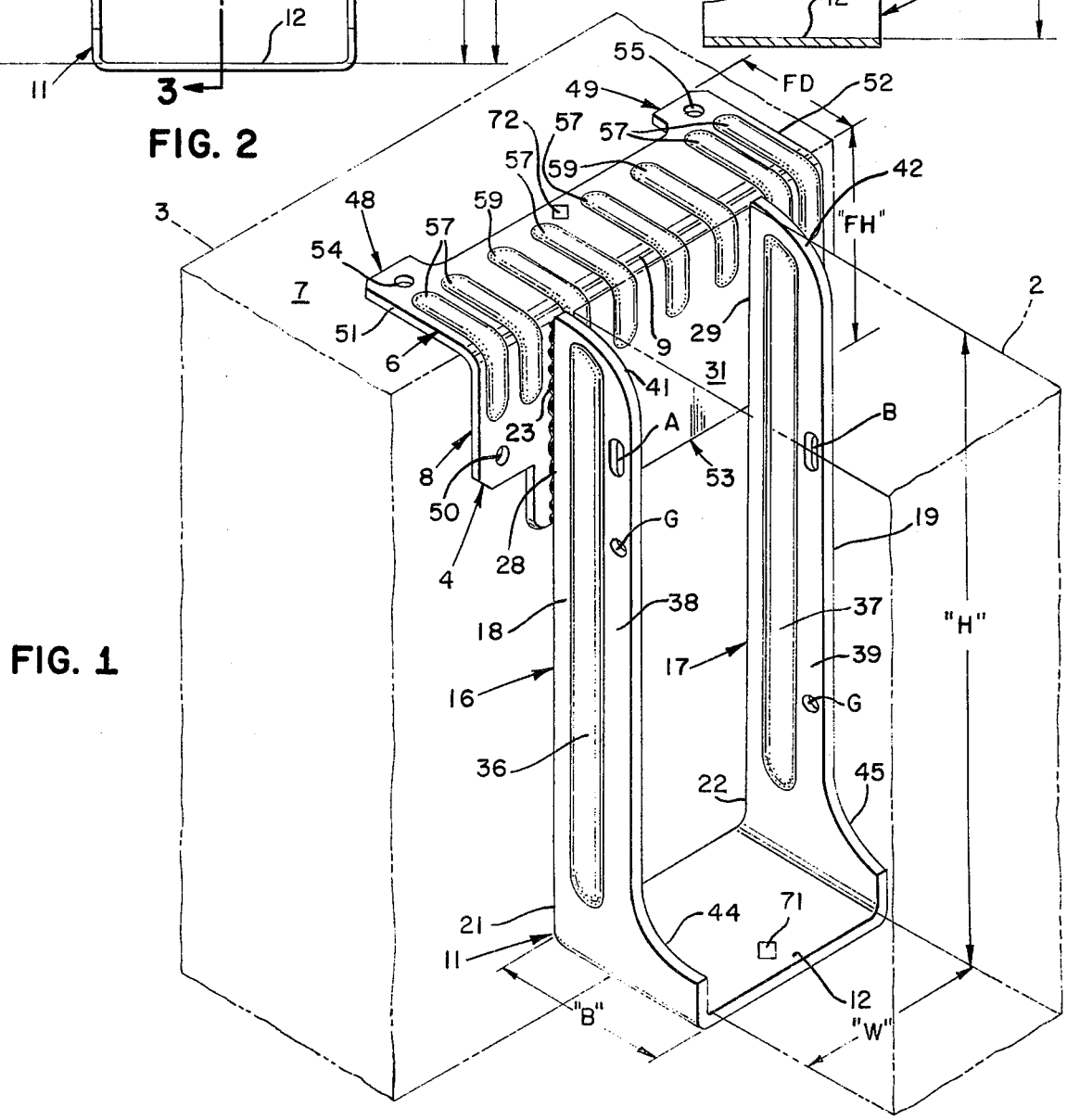

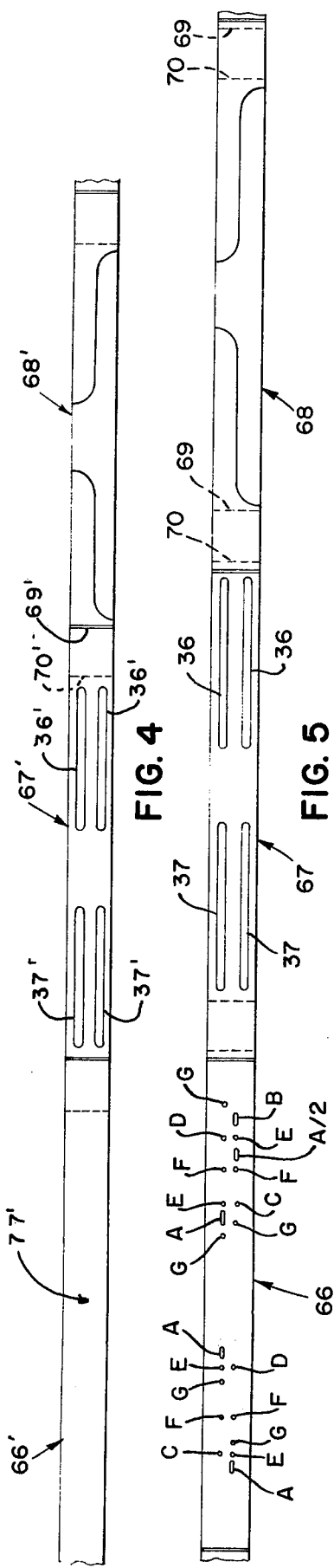
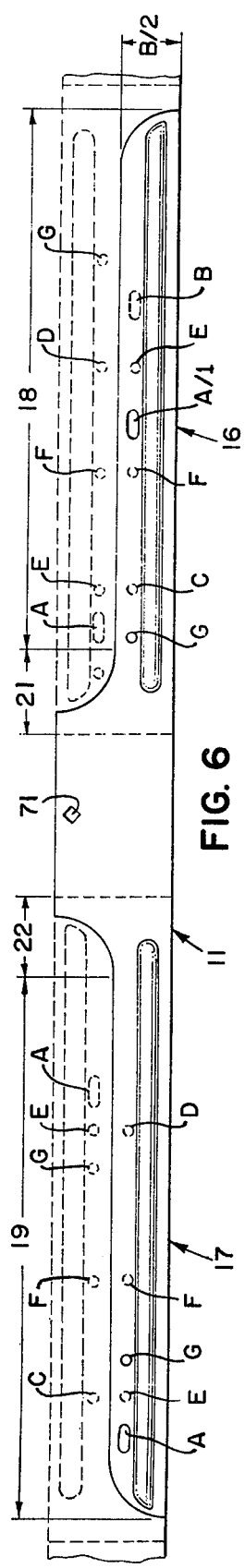
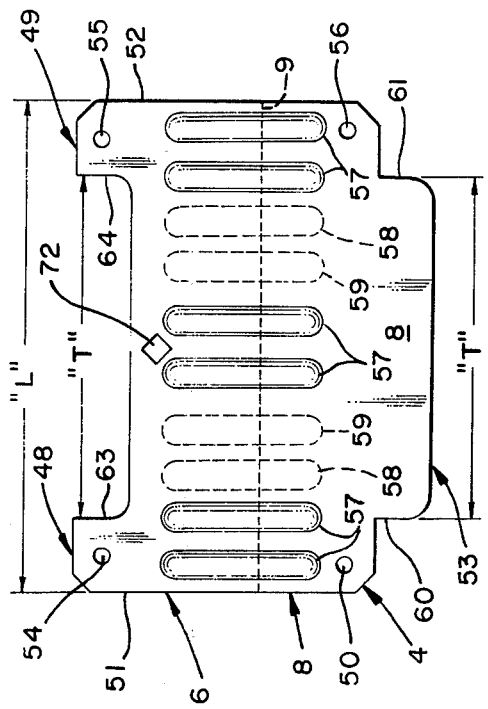

METAL HANGER

BACKGROUND OF THE INVENTION

Structural hanger designs for lumber sizes of for example 4 × 12 inches and 4 × 14 inches have been static for over 50 years. Typically, such hanger designs have consisted of a simple rectangular top element bent along a straight line and a stirrup element of uniform width welded to the top element.

In the primitive form of the hanger of the prior art, much of the metal weight was not functioning structurally which contributed to metal waste, excess costs in transportation from factory to ultimate construction location and finally to excess structural weight.

SUMMARY OF THE INVENTION

The gist of the present invention is the use of a stirrup element having side flanges only half the width of the seat and a top angle element which is devised as a nested progressive with nailing tabs to give greater nailing distance from the member edge and a longer tongue length for maximum weld length.

Metal savings per hanger unit over comparable prior art hangers varies from 38.4% to 51.4%.

The top angle element may be made on high-production automated tooling. The top angle element is of universal design in that one top-flange angle element may be used with any one of several stirrup elements of several different widths.

The stirrup element may also be made on high-production automated tooling. The stirrup element involves a new concept, in that, any width up to 4 inches and any length or any seat depth may be made from the same single die system.

Further, the top angle element is formed with a special embossment configuration combination so that the embossments will not interfere with the welding of the edges of the stirrups to the top element.

BRIEF DESCRIPTION OF THE DRAWINGS

FIG. 1 is a perspective view of the hanger of the present invention with a portion of the wood structural members in phantom line.

FIG. 2 is a front view of the hanger of FIG. 1.

FIG. 3 is a side cross-sectional elevation view of the hanger of the present invention taken along line 3—3 of FIG. 2.

FIG. 4 is a schematic plan view of the progression of the die in forming and cutting one form of the stirrup element of the present invention such as the 4 × 12 model.

FIG. 5 is a schematic plan view of the progression of the die in forming and cutting another form of the stirrup element of the present invention such as the 4 × 14 model.

FIG. 6 is an enlarged plan view of one complete stirrup element and portions of two adjacent stirrup elements prior to bending.

FIG. 7 is a top plan view of the top angle element prior to bending. The dotted lines show alternate forms of construction.

BRIEF DESCRIPTION OF THE PREFERRED EMBODIMENTS OF THE INVENTION

The improved hanger of the present invention for connecting a wood member 2 such as a purlin to a wood structural member 3 consists briefly of: an angle element 4 having a top flange 6 adapted for connection to the top side 7 of the structural member and includes a lower depending flange 8 formed at substantially a right angle to the top flange along a bend line 9; a stirrup element 11 adapted for receiving a wood member including a seat 12 having a full variable dimension depth "B"; a variable width "W" and a pair of integral right angularly related side flanges 16 and 17; each side flange includes an upper portion 18 and 19 having a width equal to one half the depth of the seat and each side flange also includes a lower minor portion 21 and 22 having a dimension gradually increasing in width until it is equal to the depth of the seat; and weld means 23 and 24 attaching portions 26 and 27 of the back edges 28 and 29 to the front face 31 of the lower depending flange of the angle element leaving portions 32 and 33 of the total length "H" of the stirrup flange with no weldment to the angle element.

Embossments 36 and 37 are formed in the side faces 38 and 39 of each of the side flanges of the stirrup. The embossments extend substantially the length of the upper portions increasing the resistance of the flanges to torsion and bending forces.

The side flanges of the stirrup are constructed so that the uppermost portions 41 and 42 gradually decrease in width. As described below, the uppermost portions 41 and 42 are reverse mating surfaces of the lower portions 44 and 45 of the side flanges.

The angle element is constructed on high production automated tooling and may be used with the stirrup element previously described or it may be connected to a stirrup element having side flanges equal in width to the seat width. The stirrup element may be constructed with or without embossments. A brief description of an alternate form of the invention using the preferred angle element shown in FIG. 7 consists of: an angle element having a top flange adapted for connection to the top side of a wood member and has a lower depending flange formed at substantially a right angle to the top flange; the top flange is formed with a pair of spaced tab members 48 and 49 which extend along the side edges 51 and 52 and the lower depending flange is formed with a centrally located tongue portion 53 extending beyond the side edges of the lower flange; a stirrup element adapted for receiving a wood member including a seat and a pair of integral right angularly related side flanges; weld means attaching the back edge of the stirrup element to the front face of the tongue portion of the lower depending flange; and the tab members are formed with fastener receiving openings 54 and 55. Flange 8 is formed with fastener openings 50 and 56.

Resistance of the top angle element to bending and torsion forces is greatly increased by forming a plurality of embossments 57 and 58 or 57 and 59 in the angle element. The embossments are spaced along the width of the angle element and extend partially onto the top flange, around the right angular formed portion and partially onto the lower depending flange.

The top angle element may be constructed from a constant width metal coil on a progressive die machine by dimensioning the width "T" between the outer edges 60 and 61 of the tongue 53 the same as the distance "T" between the inside edges 63 and 64 of the tabs 48 and 49.

In order to provide sufficient surface for welding, some of the embossments on the top angle element may be omitted. For example, for seat widths of 3 9/16 inches, the angle should be formed with embossments 57 and 59. For seat widths of 1 9/16 inches the angle should be formed with embossments 57 and 58.

The top angle element maximizes the distribution of the material in a number of ways, while restricting the part to a net 26 square inches of material. The basic blank is devised as a nested progressive. Top tabs are 2½ inches deep for nailing as far from the corner as possible. The 6½ inches of bend are heavily bossed with eight carefully designed bosses; these provide not only some of the necessary load carrying capacity but a safety factor purpose for installation conditions before nailing. The progressive nested configuration is devised to provide up to 2¼ inches of welding length on the face, as needed for the higher valued sub-models. Top-bearing area is designed specifically at 5,000 lbs. The strength of the element has been more than proven by the test fact that none of the International Conference of Building Officials (ICBO) tests were limited by any rebend characteristic of this element.

In brief, the method of forming the top element of the hanger comprises the steps of; selecting a strip of metal of uniform width; embossing the strip at longitudinal intervals with a plurality of axially aligned, transversely spaced embossments; cutting the strip transversely along a curvilinear line so that a centrally located tongue of one top element forms the transversely spaced tabs of an adjacent top element; and bending the top element along a transverse line through a plurality of the embossments.

The stirrup concept starts from the required seat bearing depth dimension for various models; for example, stirrups with seat bearing widths of 2 9/16 inches, 3-0 inches, and 3¾ inches. The unique feature is that any seat depth model may be run through the identical tooling, without any tooling change whatsoever, by simply varying the width of the coil stock. A split-element design provides side members of exactly half the seat dimension for most of the height length. This equals approximately the actual metal sections needed as a ratio to the seat capacity. For torsion reasons, however, a single heavy boss is used the full length of both sides. The tooling may be set up to provide various nail patterns from strap to purlin for varying requirements: standard, uplift slotted and others.

The form die inserts for a 4 × 12 stirrup are shown in FIG. 4 and the form die insert for a 4 × 14 stirrup are shown in FIG. 5.

The method of forming a stirrup element for a purlin hanger for a 4 × 12 is illustrated in FIG. 4.

The method of forming a stirrup element of a purlin hanger for a 4 × 14 is illustrated in FIG. 5 and consists briefly of selecting a strip of metal 66 of uniform width; punching fastener holes A through G according to a schedule at predetermined locations in the metal strip; forming parallel longitudinally extending transversely spaced embossments in the metal strip as shown by strip 67; cutting the metal strip in progression as shown by strip 68 so as to form a hanger seat having a width equal to the width of the metal strip and side flanges having a width equal to one half the width of the metal strip; and bending the strip along transverse lines 69 and 70 across the seat member forming side flanges at substantially right angles.

An alternate form of forming the top element of the purlin hanger is to provide tooling for forming a plurality of fixed embossments and a plurality of alternate embossment locations for the purpose of enabling the same top element to be attached to stirrup elements of various selected widths. As previously stated for seat widths of 3 9/16 inches, the angle should be formed with embossments 57 and 59. For seat widths of 1 9/16 inches the angle should be formed with embossments 57 and 58.

Typical dimensions and load values for four typical purlin hangers constructed in accordance with the present invention are as follows:

| Model | Joist Size | Stirrup | | | | Top Element | | | |
|---|---|---|---|---|---|---|---|---|---|
| | | H | W | B | Mat. | L | FD | FH | Mat. |
| WN 412 | 4 × 12 | 11 1/8 | 3 9/16 | 2 9/16 | 12 ga. | 6 1/2 | 2 1/2 | 2 1/4 | 12 ga. |
| WN 414 | 4 × 14 | 13 1/8 | 3 9/16 | 2 9/16 | 12 ga. | 6 1/2 | 2 1/2 | 2 1/4 | 12 ga. |
| HWN 412 | 4 × 12 | 11 1/8 | 3 9/16 | 3 | 12 ga. | 6 1/2 | 2 1/2 | 2 1/4 | 12 ga. |
| HWN 414 | 4 × 14 | 13 1/8 | 3 9/16 | 3 | 12 ga. | 6 1/2 | 2 1/2 | 2 1/4 | 12 ga. |

| Model | Nailing | | I.C.B.O. Loads | | |
|---|---|---|---|---|---|
| | Header | Joist | Ult. | Other | Roof |
| WN 412 | 2-N54A | 2-10d | 10176 | 3350 | 3350 |
| WN 414 | 2-N54A | 2-10d | 10176 | 3350 | 3350 |
| HWN 412 | 4-N54A | 2-10d | 11725 | 3800 | 3800 |
| HWN 414 | 4-N54A | 2-10d | 11725 | 3800 | 3800 |

Dimensions are in inches. Top element designation "L" is the length, "FD" is the depth, "FH" is the height. Loads are in pounds. N54A nails are ¼ × 2½ inches.

The most startling accomplishment of the present invention is the weight reduction in the present purlin hanger line. As the table set forth below shows, a metal savings of between 38.4% and 53.3% was achieved yet the purlin hangers of the present invention are rated at comparable or higher ICBO load values.

| Present Model | (ICBO Value) | Theoretical Weight |
|---|---|---|
| W412 | (3,230 lbs.) | 3.26 lbs. |
| W414 | (3,230 lbs.) | 3.41 lbs. |
| HW412 | (4,140 lbs.) | 4.75 lbs. |
| HW414 | (4,140 lbs.) | 4.96 lbs. |

(ICBO         Theoretical         Metal

-continued

| New Model | Value) | Weight | Savings |
| --- | --- | --- | --- |
| WN412 | (3,350 lbs.) | 2.01 lbs. | 38.4% |
| WN414 | (3,350 lbs.) | 2.17 lbs. | 36.4% |
| HWN412 | (3,800 lbs.) | 2.22 lbs. | 53.3% |
| HWN414 | (3,800 lbs.) | 2.41 lbs. | 51.4% |

Referring to FIG. 6, the letters adjacent the nail holes indicate the code for the tooling set up to punch holes for particular designs. The holes to be punched and the nailing schedule is shown in the following schedule for purlin hangers in the WN 4 × 14 and HWN 4 × 14 series.

| WN 414 | No uplift | 10d | A + B |
| --- | --- | --- | --- |
| HWN 414 | No uplift | 10d | A + B |
| WNA 414 | 435 lb. uplift | N20A | G |
| WNA 414 | 655 lb. uplift | N20A | G + F |
| HWN 414 | 660 lb. uplift | N54A | E |
| HWN 414 | 1320 lb. uplift | N54A | E + C or D |

N54A hanger nails have an annular thread of 0.250 inch diameter and are 2½ inches long. Slots A and B are 0.156 × ⅝ inch center to center. Holes A and B are 0.156 inch diameter. Holes G and F are 0.218 inch in diameter. Material of the hanger as previously stated is 12 gauge galvanized.

The top angle element is formed with square nail opening 72 and a square nail opening 71 is formed in seat 12.

The method of forming a stirrup element of a purlin hanger for a 4 × 12 stirrup is illustrated in FIG. 4. A strip of metal 66' of uniform width is selected. First, holes are punched in the strip portion indicated by the number 77. Specified holes, selected according to a schedule are punched in the metal. The placement of the holes is similar to that shown in FIG. 5 and labeled A - G. For purposes of simplicity, the entire schedule of holes as illustrated in FIG. 5 is not repeated. Next, parallel longitudinally extending transversely spaced embossments 36' and 37' are formed in the metal strip as shown by strip 67'. Next, the strip is cut in progression as shown by strip 68' so as to form a hanger seat having a width equal to the width of the metal strip and side flanges having a width equal to one half the width of the metal strip. Finally, the strip is bent along transverse lines 69' and 70' across the seat member forming side flanges at substantially right angles.

I claim:

1. A purlin hanger comprising:
   a. an angle element having a top flange adapted for connection to the top side of a wood member and having a lower depending flange formed at substantially a right angle to said top flange;
   b. a stirrup element adapted for receiving a wood member including a seat and a pair of integral right angularly related side flanges;
   c. said side flanges include an upper portion having a width equal to one half the depth of said seat and a lower minor portion having a dimension gradually increasing in width until it is equal to the depth of said seat;
   d. weld means attaching a portion of the back edge of said stirrup element to the front face of the lower depending flange of said angle element; and
   e. an embossment in the side of each of said side flanges of said stirrup extending substantially the length of said upper portion increasing the effective thickness of said flanges for increasing the resistance of said flanges to torsion and bending forces.

2. A purlin hanger as described in claim 1 comprising:
   a. the uppermost portions of said upper portions of said side flanges of said stirrup element gradually decrease in width.

3. A purlin hanger as described in claim 2 comprising:
   a. said top flange is formed with a pair of spaced tab members extending along the side edges, and said lower depending flange is formed with a centrally located tongue portion extending beyond the side edges of said lower flange, and
   b. said stirrup element is attached to the tongue portion of said lower depending flange.

4. A purlin hanger as described in claim 3 comprising:
   a. a plurality of embossments spaced along the width of said angle element extending partially onto said top flange, around said right angular formed portion and partially onto said lower depending flange.

5. A purlin hanger as described in claim 3 comprising:
   a. The width of said tongue portion of said lower depending flange is dimensioned to equal the distance between said tabs on said top flange.

6. An improved purlin hanger comprising:
   a. an angle element having a top flange adapted for connection to the top side of a wood member and having a lower depending flange formed at substantially a right angle to said top flange;
   b. said top flange is formed with a pair of spaced tab members extending along the side edges, and said lower depending flange is formed with a centrally located tongue portion extending beyond the side edges of said lower flange;
   c. a stirrup element adapted for receiving a wood member including a seat and a pair of integral right angularly related side flanges;
   d. weld means attaching the back edge of said stirrup element to the front face of the tongue portion of said lower depending flange; and
   e. said tab members are formed with fastener receiving openings.

* * * * *